June 15, 1965     S. LEVY     3,189,325
MIXING DEVICE
Filed Jan. 22, 1962
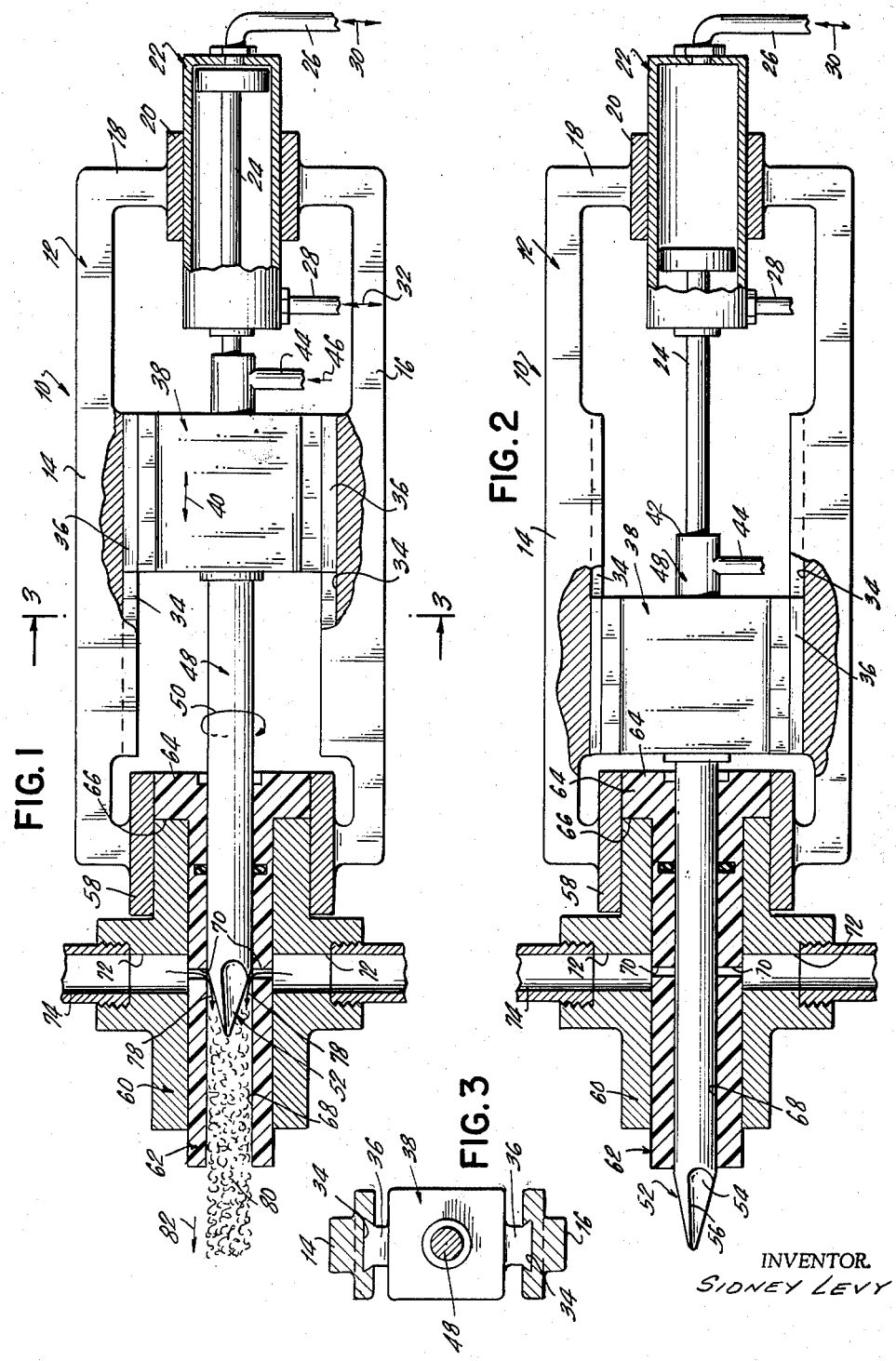
INVENTOR.
SIDNEY LEVY United States Patent Office 3,189,325
Patented June 15, 1965

3,189,325
MIXING DEVICE
Sidney Levy, 145 W. Cuthbert Blvd., Oaklyn 6, N.J.
Filed Jan. 22, 1962, Ser. No. 167,768
5 Claims. (Cl. 259—10)

The present invention relates to devices for mixing fluid streams.

The mixing of two or more fluid streams is a very common operation in many processes and many different means have been hitherto proposed in the prior art to accomplish the result of producing an intimate mixture of the several streams of fluid. In mixing fluid streams, it is desirable that, in addition to producing an intimate mixture of the fluids in a minimum amount of time, a minimum amount of material be retained in the mixing device. This is desirable for many reasons, especially since the mixture will represent more accurately the composition of the two or more entering streams if a minimum amount of material retention is present, particularly when there are variations in the rate of feed in the several streams. In addition, a common reason for mixing two or more fluid streams is to produce a resultant chemical reaction. Such reactions are easier to control when material retention and mixing time are kept at a minimum.

It is desirable also to make the geometry of the mixing device as simple as possible in order to avoid having material entrapped in the recesses of the mixing device and the resultant contamination of the mixtures. It is desirable also to make the geometry of the mixing device simple so that the chamber thereof can be emptied of its contents at the conclusion of the mixing cycle with a minimum amount of difficulty.

The foregoing requirements are especially desirable in a mixing device which is used to mix streams of reactive resins where the viscous nature of the materials presents a serious problem both in mixing and in clean-up of the device.

It is an object of the present invention to provide a mixing device of simple construction and operation which overcomes the shortcomings of the prior art devices and permits the convenient and ready mixture of fluid streams, particularly those of the types encountered in reactive resin systems.

It is another object of the present invention to provide compact means to mix a plurality of resin streams which provides for intensive shear-mixing of the fluid streams.

It is another object of the present invention to provide a simple and highly efficient device for mixing a plurality of fluid streams, wherein the fluid streams can be discontinued and the contents of the mixing means ejected at the end of each mixing cycle.

It is a further object of the present invention to provide means for mixing a plurality of fluid streams wherein the time of retention of the materials in a mixing chamber is very small, thus permitting the intensive mixing of highly reactive materials.

It is a further object of the present invention to provide a highly novel means achieving intensive shear-mixing of viscous materials, such as, for example, reactive resin materials.

It is a still further object of the present invention to provide a highly novel means both for effecting intensive shear-mixing of a plurality of fluids, as well as to eject the fluids from a mixing chamber, which ejection action serves to clean the mixing chamber.

Other and further objects, benefits and advantages of the present invention will become readily apparent to those skilled in the art from the following specification taken in connection with the accompanying drawings.

In the drawings, which represent the best mode presently contemplated for carrying out the invention:

FIGURE 1 is a side elevation view of an apparatus pursuant to the present invention, with portions thereof broken away and other portions thereof shown in section for purposes of illustration, the apparatus being shown in condition for admission of the fluids which are to be mixed;

FIGURE 2 is a view similar to FIGURE 1 with the apparatus being shown in the condition thereof after having achieved the mixing of the fluids and the ejection thereof from the apparatus; and FIGURE 3 is a sectional view, on a reduced scale, taken on the line 3—3 of FIGURE 1.

Referring to the drawings in detail, there is shown a mixing apparatus 10 pursuant to the present invention. The apparatus 10 comprises a bifurcated frame support 12 having upper and lower arms 14 and 16 which are joined by a bight 18. The bight 18 is provided with an integral circular seat 20 for a pneumatic cylinder 22. The cylinder is provided with a plunger 24 operated in the usual manner by air entering and leaving from the air conduits 26 and 28, as indicated by the arrows 30 and 32 respectively. It will be understood that the conduits 26 and 28 are connected to a suitable source of compressed air and the admission of the air to said conduits is controlled by a suitable valve mechanism.

As best shown in FIGURE 3, the upper and lower legs 14 and 16 are each provided with an internal open recess or groove 34 which defines a track in which there is slidably received a guide shoe 36 projecting from a pneumatic motor 38. Consequently, it will be understood that the pneumatic motor 38 is mounted for horizontal reciprocation, as indicated by the arrows 40, within the frame 12. In order to effect said reciprocation, the previously mentioned piston 24 of the air cylinder 22 projects from the latter and is secured to the motor 38 as at 42. Consequently, it will be understood that when air enters the conduit 26 of the pneumatic cylinder 22, the air motor 38 is moved toward the left, viewing FIGURE 1, from the position thereof illustrated in FIGURE 1 to the position thereof illustrated in FIGURE 2 and that when compressed air enters the conduit 28 of the pneumatic cylinder, the air motor 38 is retracted from the position thereof illustrated in FIGURE 2 to the position thereof illustrated in FIGURE 1.

The air motor 38 is provided with an air conduit 44, through which compressed air enters the motor 38 to operate the latter, as indicated by the arrow 46. It will be understood that the supply of air to the conduit 44 is controlled by a suitable valve arrangement which may be part of the same valve arrangement controlling the supply of air to the air cylinder 22, a suitable conventional 4-way air valve being suitable for the purpose of supplying compressed air both to the air cylinder and the air motor. The air motor is provided with a rotary shaft 48 which is operated by the motor for rotation as indicated by the arrow 50. The shaft 48 terminates in a tip 52 which is undercut or grooved as at 54 to provide a mixing and shearing blade 56.

At the forward end thereof, the legs or bifurcations 14 and 16 of the frame 12 mount a circular seat 58 for a tubular member 60. The tubular member 60 mounts a tubular sleeve 62, one end of which is provided with a portion 64 of increased diameter which is retained within the seat 58 and which abuts one end of the tubular member 60 as at 66. The sleeve 62 is provided with an internal passageway or bore 68 in which the shaft 48 has a relatively fluid-tight sliding and rotary fit. The sleeve 62 is provided with fluid entry ports 70 which extend therethrough and communicate with the bore 68 thereof. Each entry port 70 opens into or is in fluid communication with a radial passageway 72 defined within the tubular member 60. The outlet end of a conduit 74 for feeding or supplying a fluid to the passageway 72 is mounted by the tubular member 60 for fluid supply communication with each passageway 72.

In the retracted position of the pneumatic motor 38, as illustrated in FIGURE 1, the tip 52 thereof is positioned at the outlet of the ports 70 so as to define a restricted channel 78 between each port and the adjacent tapered surface of the tip 52 whereby to permit for the flow of a fluid or substance which is to be mixed through the port 70 into the bore 68 within the tubular sleeve 62, it being understood that the portion of the bore 68 forwardly of the tip 52, viewing FIGURE 1, constitutes a mixing chamber 80 for the fluids or other substances entering the chamber through the conduits 74, the radial passageways 72, the ports 70 and the channels 78. In this connection, it will be understood that each conduit 74 is connected to a suitable source of supply for the material being fed therethrough and furthermore that suitable metering facilities (not shown) of conventional construction are supplied so as to provide for the feeding of metered amounts of different fluids or chemicals or other components which are being mixed into the mixing chamber 80. The shaft 48 is rotating as the fluids enter the mixing chamber 80 and tend to flow out as indicated by the arrow 82. As the fluids pass the mixing and shearing blade 56 they are effectively shear mixed and then pass out of the chamber 80. Immediately after the metered quantity of fluids have entered and passed through the chamber 80, air is supplied through the conduit 26 of the air cylinder 22 and the air cylinder 22 advances the air motor 38 from the retracted position shown in FIGURE 1 to its projected position as shown in FIGURE 2, air in the meantime continues to be supplied to the air motor 38 through the attached conduit 44 so as to continue the rotation of the shaft 48 and the continuing mixing of the contents of the chamber 80. The rotation of the shaft 48 continues to mix the contents of the chamber by means of the rotating shaft shear mixing blade portion 56. As the rotating shaft means 48 advances to its projected position as shown in FIGURE 2, the mixture of fluids remaining within the chamber 80 is expelled by the shaft 48 from the chamber by the projection of the shaft through and out from the chamber 80 until the shear mixing blade 56 is out of the chamber 80. The shaft 48, which has, as previously indicated, a relatively tight (fluid tight) fit within the bore 68 effectively removes the contents of the chamber by projection of the contents thereof by it projective motion to effectively clean said chamber and substantially remove the contents thereof. The air (or other motor) turns at the start of the retraction and continues to turn until the metered portion of the fluid passes through the chamber 80 and it then is projected into the eject position, carrying with it the shaft 48 to the projected position shown in FIGURE 2. The last remaining portion of the material remaining on the shearing blade 56 is removed by the centrifugal action of the rotating shaft 48. The shaft 48 may then continue to rotate preparatory to initiating another mixing cycle or it may be stopped. If the shaft 48 is stopped in the projected position it is commenced rotating again as soon as the air (or other) motor is retracted, and the shaft 48 is moved to the retracted position as shown in FIGURE 1 so that the shaft 48 is rotating the shear mixing blade 56 when the fluid entry means 70 are uncovered. Consequently, when the shaft is retracted to the position thereof illustrated in FIGURE 1, so as to clear the ports 70 for the entry of the next metered amount of each fluid within the mixing chamber 80, the chamber will be cleaned of the previously metered amount of said fluids so as not to interfere with the required reaction that is to take place as a result of the mixture of the fluids, since the relative proportions thereof will not be changed by remnants of the previous mixture and the last residue on the tip is removed by centrifugal forces.

In view of the foregoing, it will be readily apparent that the shaft 48 provides both a rotary shear-mixing action of the fluids within the mixing chamber 80, as well as serving to cleanse the chamber after each mixing action.

While I have illustrated and described the presently preferred embodiment of my invention, it will be apparent that changes and modifications may be made therein without however departing from the spirit and scope of the invention as set forth in the appended claims.

I claim:

1. A mixing device comprising means defining a mixing chamber having an elongated bore, entry ports defined in said chamber, said entry ports being in fluid flow communication with said bore between the ends thereof, shaft means mounted in substantially fluid-tight relation in said bore, said shaft means extending into said bore from one end thereof and being movable to and from retracted and projected positions thereof, said shaft means having a front end defining a shear mixing means, said shear mixing means being positioned adjacent said entry ports when said shaft means is in said retracted position, said front end projecting outwardly from said other bore end and said entry ports being obstructed by said shaft means to prevent the flow of fluid therefrom when said shaft means is in said projected position, and said shaft means being mounted for rotation within said bore.

2. A mixing device as in claim 1, means for reciprocating said shaft relative to said bore, and means for rotating said shaft relative to said bore.

3. A mixing device comprising a support means, a controllable reciprocating means mounted by said support means, rotation means engaged with said reciprocating means, a shaft rotatable by said rotation means and reciprocable by said reciprocating means through the engagement thereof with said rotation means, means mounted by said support means and defining a mixing chamber, said shaft means projecting into said mixing chamber and having a forward end thereof provided with means for providing rotational shear mixing, said mixing chamber having a bore of substantially constant diameter into which said shaft means projects from one end of said bore, and means for feeding a plurality of fluids into said bore between the ends thereof at a position adjacent the forward end of said shaft means when said shaft means is in a retracted position for contact with said shear mixing means, said shaft means being movable from a retracted position thereof in which said feeding means are uncovered by said shaft to a projected position thereof in which said feeding means are covered by said shaft means and said shaft means projects from the other end of said bore.

4. A mixing device as in claim 3, said reciprocating means being an air cylinder actuated by an air valve.

5. A mixing device as in claim 3, said rotation means being an air motor actuated by a control valve.

References Cited by the Examiner

UNITED STATES PATENTS

| 1,927,092 | 9/33 | Howard | 222—229 X |
| 2,570,079 | 10/51 | Spremulli | 259—4 X |
| 2,957,203 | 10/60 | Marshall | 259—7 X |
| 3,008,696 | 11/61 | Oldershaw et al. | 259—9 X |

CHARLES A. WILLMUTH, *Primary Examiner.*